United States Patent

[11] 3,620,488

| [72] | Inventor | Justin G. Miller, deceased<br>late of Los Angeles, Calif. by Rita A. Miller,<br>administratrix |
|---|---|---|
| [21] | Appl. No. | 845,113 |
| [22] | Filed | May 29, 1969 |
| [45] | Patented | Nov. 16, 1971 |
| [73] | Assignee | Lear Siegler, Inc.<br>Santa Monica, Calif. |

[54] AIRCRAFT COMMAND MIXING DEVICE
24 Claims, 4 Drawing Figs.

[52] U.S. Cl. ............................................. 244/77 E,
244/17.13, 244/77 D
[51] Int. Cl. ..................................................... B64c 13/18
[50] Field of Search .......................................... 244/77, 77
D, 77 E, 77 SE, 7, 17.13; 343/107, 108

[56] References Cited
UNITED STATES PATENTS

| 2,845,623 | 7/1958 | Iddings | 244/77 D X |
| 3,105,660 | 10/1963 | Lenefsky et al. | 244/77 D |
| 3,169,000 | 2/1965 | Ernst et al. | 244/77 D X |
| 3,237,107 | 2/1966 | Bresenoff et al. | 244/77 D X |
| 3,048,836 | 8/1962 | Guarino et al. | 343/7 |

Primary Examiner—Milton Buchler
Assistant Examiner—Jeffrey L. Forman
Attorney—Christie, Parker & Hale ABSTRACT: A system is disclosed for producing aircraft steering command signals for application to the controls of a vertical takeoff and landing (VTOL) or a vertical/short takeoff and landing (V/STOL) aircraft during the transition from cruise flight to hover. A command signal mixing device is provided for processing aircraft command signals as a function of speed to produce steering command signals adapted to simulate the manner in which a pilot normally flies the aircraft. In a preferred form of the invention, vertical-plane path control is effected by routing vertical command information through the command mixer to provide velocity-dependent steering command signals for application to the collective pitch and pitch cyclic controls of the aircraft. Lateral-plane path control is effected by routing lateral command information through the command mixer to produce velocity-dependent bank and turn steering command signals.

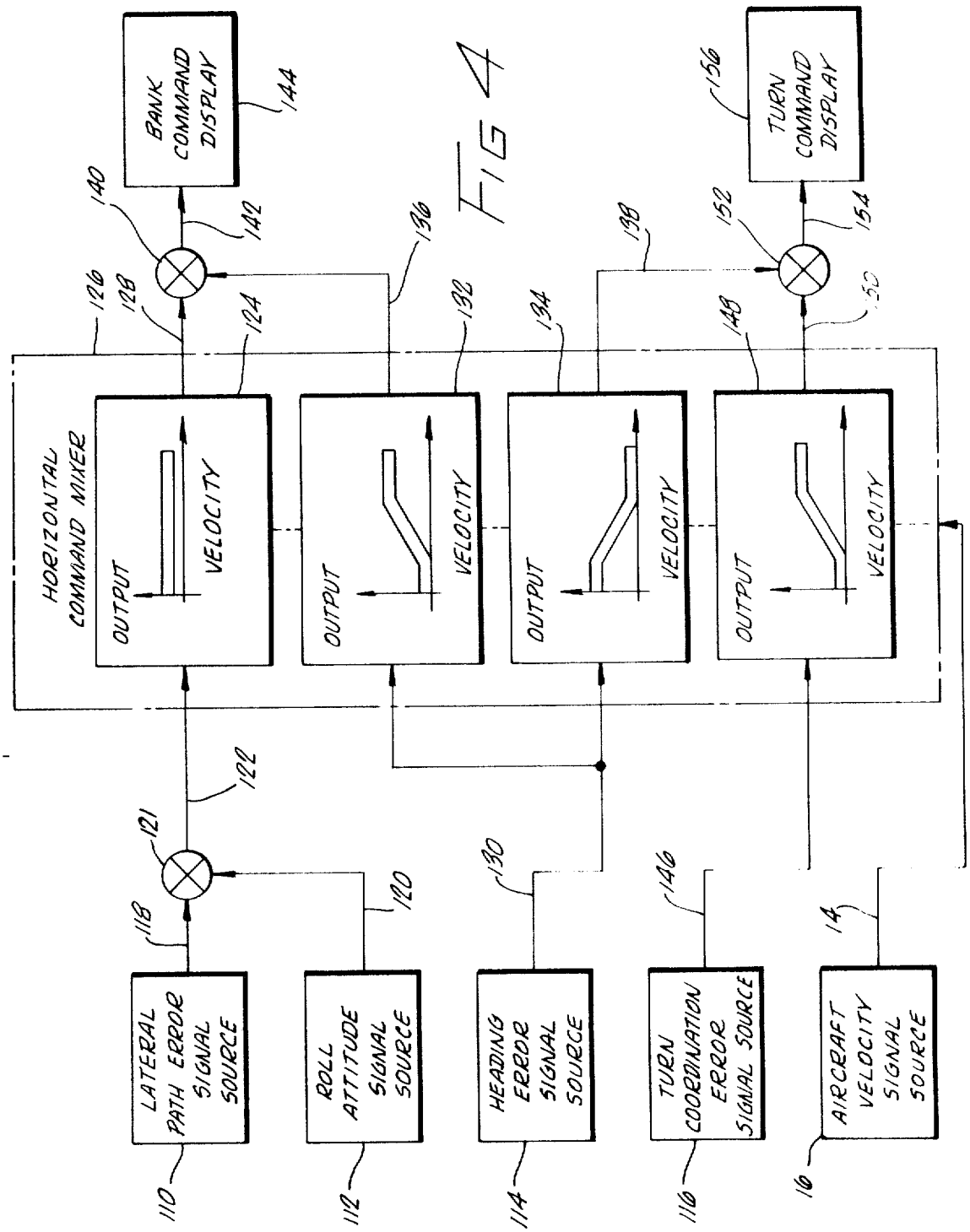

AIRCRAFT COMMAND MIXING DEVICE

BACKGROUND OF THE INVENTION

1. Field of the Invention

This invention relates to flight control systems for aircraft, and more particularly to a system which processes flight command information to obtain steering signals for use in vertical and lateral plane control of the aircraft. The invention is particularly useful in controlling the flight path of VTOL and V/STOL aircraft during the transition from cruise speeds to hover speeds.

2. Description of the Prior Art

In the past, a variety of aircraft flight director systems have been developed which enable a pilot to perform a terminal approach and zero-visibility landing. Generally, these systems provide a predetermined or reference path usually defined by a radio beam. Deviation of the aircraft from the reference path beam is detected by airborne data sensors, and the flight director system provides error signals having a magnitude proportional to the displacement and/or rate of displacement of the aircraft from the desired path. The error signals are referenced to control axes of the aircraft and displayed on the instrument panel to assist the pilot in maneuvering the aircraft to reduce the error signals to zero. The flight director system is often supplemented by an automatic flight control system coupled to flight director signals in any or all control axes to automatically reduce the error signals to zero just as the pilot would if flying manually.

The primary goal of a flight director system during landing is to provide a smooth transition from high-speed, high-altitude cruise flight conditions to touchdown by simulating as close as possible a normal pilot-controlled landing. The systems now in use for controlling the flight path of conventional aircraft have accomplished this task with a high degree of success, but these systems are not completely adaptable for use in VTOL or V/STOL aircraft. At cruise speeds a VTOL or V/STOL aircraft is flown essentially like a conventional aircraft, but during the low-speed flight, piloting techniques differ markedly from those of conventional fixed-wing aircraft. During normal visible flight at high speeds, vertical-plane path control is effected by the pitch cyclic control only. The collective stick at cruise speeds is typically locked in place unless a substantial change in speed or altitude is desired. Lateral control at high speeds is achieved by the turn command display which provides information for coordinated flight.

As low-speed conditions are approached, the control techniques used by the pilot of the VTOL helicopter differ from those used in conventional aircraft. For example, the pilot begins to make more use of his collective pitch and antitorque rotor controls. The slower the speed, the more critical the operation of the collective stick and rotor controls becomes, especially when approaching a landing. At very low speeds such as hover or near-hover, the pilot controls altitude and vertical speed primarily with the collective stick, using the pitch cyclic stick to control longitudinal velocity. Lateral-plane control is effected by the turn command display which provides heading error so that the antitorque rotor is used to maintain the desired runway heading or pad landing direction during final maneuvering before touchdown. The bank command display is used at all speeds to control lateral path error by varying roll altitude.

SUMMARY OF THE INVENTION

This invention provides a system for processing vertical and lateral-plane aircraft commands in accordance with aircraft speed to obtain steering information for controlling the flight path of the aircraft during the transition from cruise speeds to touchdown. The command signals are routed through a command signal mixing device which varies the authority of the commands depending upon the speed of the aircraft. Resultant steering information closely simulates the manner in which a pilot normally flies the aircraft, and the invention provides means for achieving a smooth transition between high-speed cruise flight and low-speed flight.

The command signal mixing device of this invention is adapted to process command information from a variety of sources. Preferably, the command information processed comprises error signals developed by conventional flight control systems for achieving vertical and lateral-plane path control. The command signal mixing device couples command signals to the aircraft steering means in accordance with the magnitude of aircraft speed. The command mixing device is adapted to provide steering information which varies in accordance with actual aircraft speed, a properly generated desired speed signal, or a desired speed profile which varies as a function of time or altitude, for example.

The command mixing device of this invention is particularly useful in controlling the flight path of aircraft adapted to ascend and descend in a relatively vertical direction. This invention is hereinafter more particularly described as it relates to the control system of a typical VTOL or V/STOL helicopter, but application is not limited to helicopters only, since presently known propeller propulsion tilt-wing V/STOL aircraft have control systems deliberately designed to conform to helicopter type flight control during STOL or VTOL operation. Application to jet-lift VTOL or other VTOL aircraft is possible as well, so long as pilot control elements exist which are analogous in operation to the VTOL and V/STOL helicopter controls hereinafter described.

When adapted for use in vertical-plane path control of a VTOL or V/STOL helicopter, the command signal mixing device of this invention processes aircraft command, error, or steering information, which is basically vertically and horizontally referenced, to produce steering signals for application to the collective pitch and pitch cyclic controls of the aircraft. The information processing varies the authority of a vertical command between the pitch and collective control axes as a function low-speed speed to reflect the fact that a helicopter is flown at high speeds with the pitch control only, whereas at low speeds the pitch control has no significant effect on vertical control while the collective control has maximum effect. At transitional speeds between the end points of cruise speed and hover (or near-hover) speeds, the vertical command mixing device is adapted to simultaneously vary the influence of the pitch and collective controls to simulate the interaction of these controls during transitional speeds. The proportioning operation produced by the command signal mixing means of this invention is adjustable; in the preferred form, the proportioning operation is linear, but it may follow some other control scheme which proves optimum for a given type of aircraft. Further, the magnitudes of the maximum and minimum transitional speeds for application to each steering control are adjustable.

When adapted for use in lateral-plane path control of a VTOL or V/STOL helicopter, the command mixing device processes lateral command signals adapted to achieve a smooth transition from cruise flight under coordinated command control to low-speed flight in which aircraft azimuth control is based on a predetermined heading and lateral attitude is controlled by uncoordinated maneuvering resulting from changes in bank attitude. The lateral command signals processed preferably are dependent upon aircraft lateral path error, roll attitude, heading error, and lateral turn coordination error. The lateral command mixing device includes signal processing means adapted to vary the authority of these commands in accordance with aircraft speed. Steering command signals computed by the lateral command mixing device preferably comprise a bank or roll attitude command signal and a turn or azimuth command signal. The output of the lateral command mixing device reflects the fact that at all speeds, the bank command signal is used to control lateral error through a variation of roll attitude, while at high speeds the turn command signal provides coordinated flight steering information. In the hover speed range, the turn coordination error signal does not affect the turn command signal. Instead, the turn command signal is influenced primarily by heading error which reflects the fact that the antitorque rotor is used to maintain the desired runway heading or pad landing direction during final maneuvering before touchdown. In the same speed range, bank command directs a lateral translation as required to maintain the aircraft on a desired lateral path. At transitional speeds, the lateral command mixing device schedules heading error and turn coordination error signals with aircraft speed to reflect the fact that heading is maintained by increasing the use of the turn command signal as aircraft speed increases, while the influence of the turn coordination signal on the turn command signal decreases as aircraft speed decreases. Further, the command mixing device reflects the fact that the influence of the heading error on the bank command signal increases with an increase in aircraft speed.

BRIEF DESCRIPTION OF THE DRAWINGS

The features of a specific embodiment of the best mode contemplated of carrying out the invention are illustrated in the drawings, in which:

FIG. 4 is a block diagram showing the operation of a preferred system for processing lateral-plane command signals for application to the controls of a VTOL or V/STOL aircraft.

DETAILED DESCRIPTION OF SPECIFIC EMBODIMENTS

Figure 1:
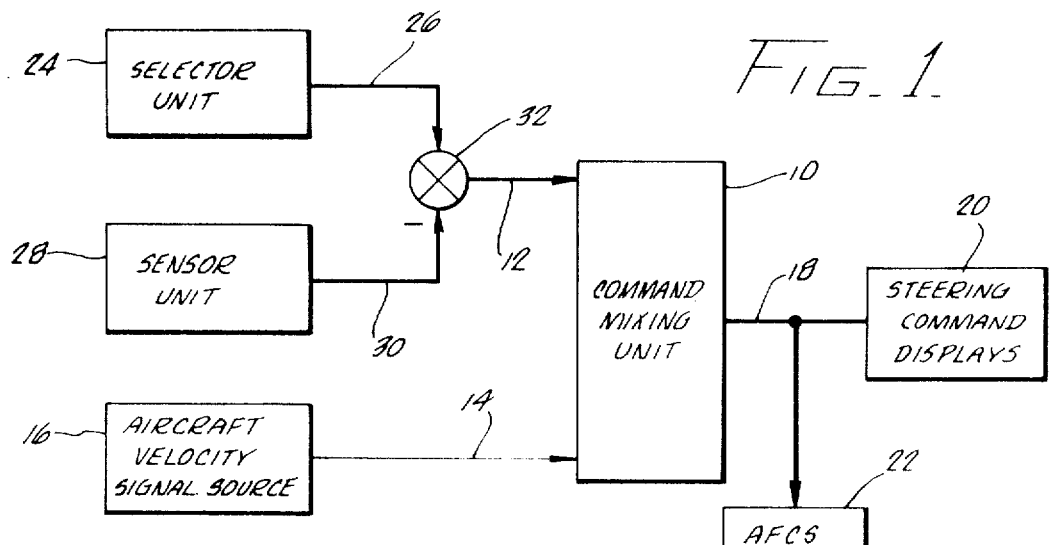
FIG. 1 is a block diagram showing the basic operation of the control system of this invention.

Referring to the drawings, a command mixing unit 10 in accordance with this invention is adapted to receive aircraft command signals 12 and a signal 14 from an aircraft velocity signal source 16. The command mixing means is designed to process the aircraft command signals depending upon aircraft speed to produce a set of steering command signals 18 which enable the aircraft to achieve smooth transition from cruise flight to touchdown. The steering signals are preferably fed to cockpit instrument panel steering command displays or utilization means 20 for use as a pilot-monitored flight director system. The steering signals can also be coupled to an aircraft flight control system 22 to provide semiautomatic or completely automatic flight path control.

The command mixing means of this invention is adapted to process the aircraft command signals generated by a variety of signal sources. Preferably, command signals comprise error signals produced by vertical and lateral-plane flight control systems. A typical control system includes a selector unit 24 for generating a system of signals 26 which define the desired attitude of an aircraft. A sensor unit 28 computes a similar set of signals 30 which define the actual attitude of the aircraft; and signals 26 and 30 are fed into a subtracting device 32 for computing aircraft command signals 12 representing the deviation of the aircraft from its desired path. Typical aircraft command signals for vertical-plane control include vertical and horizontal displacement from a reference position or path, or variations from a reference speed, or other similar command, error, or path damping signals, or combinations of these signals. Lateral-plane information to be processed may include signals from airborne data sensors such as body attitude and heading, and operating mode information selected by the pilot such as guidance information available from standard ILS systems.

Figure 2:
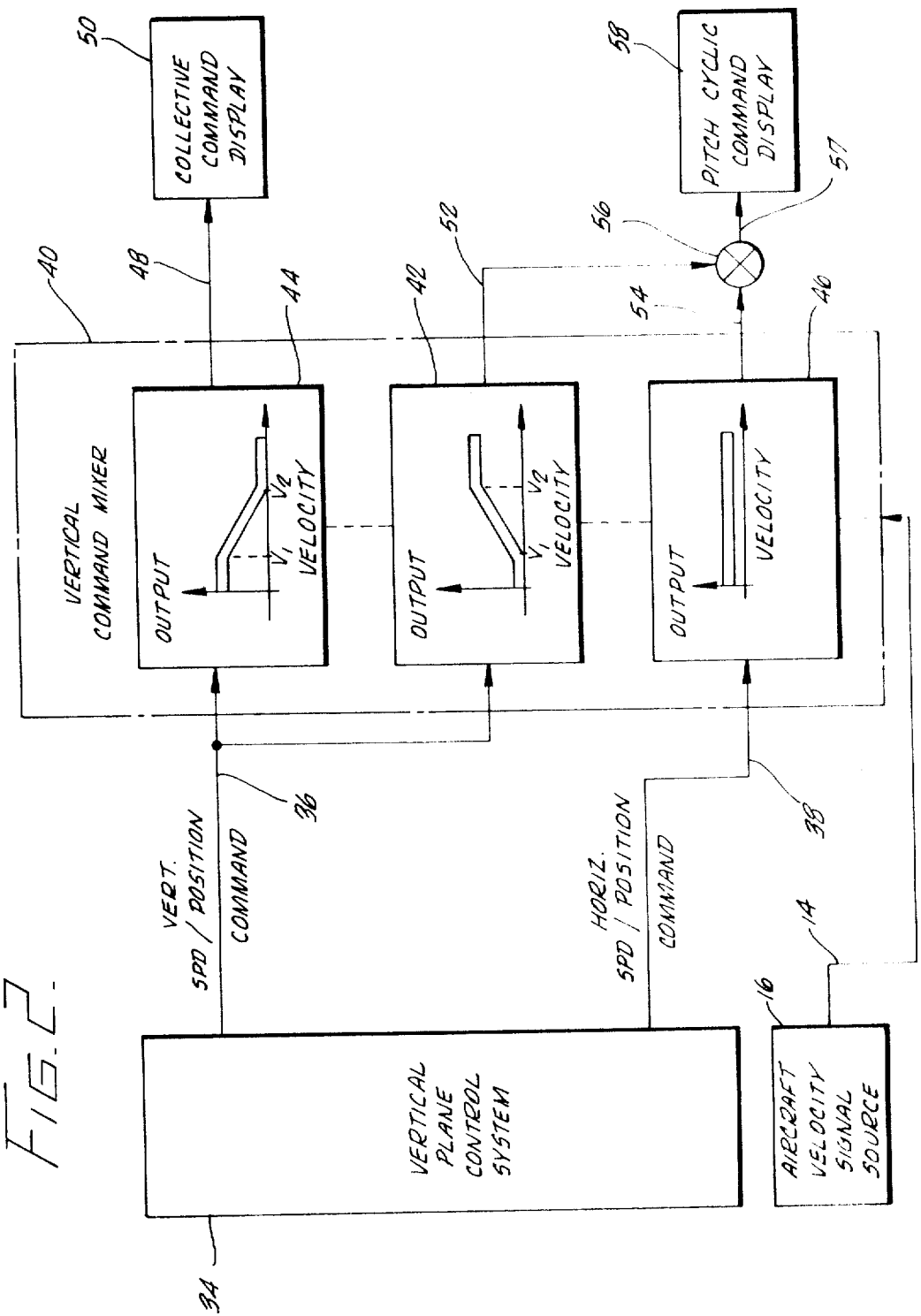
FIG. 2 is a block diagram showing the operation of a preferred system for processing vertical-plane command signals for application to the controls of a VTOL or V/STOL aircraft.

A preferred command mixing scheme for achieving vertical-plane control of a VTOL or V/STOL aircraft is shown in FIG. 2. The system illustrates the basic concept of scheduling command signals with aircraft speed to achieve proper control of the aircraft at transition speeds as well as at the end points of cruise speed and hover speed. A vertical-plane control system 34 produces a system of aircraft command, error, or steering information, which is basically vertically and horizontally referenced, for use in vertical-plane path control of the aircraft. The information generated by control system 34 is represented generally by a vertically referenced command signal 36 and a corresponding horizontally referenced command signal 38. The signals are then fed to a vertical command mixer 40 for scheduling the signals in accordance with aircraft speed for application to the vertical steering controls of the aircraft. Instantaneous aircraft speed information is coupled to the command mixer by signal 14 from aircraft velocity signal source 16. Command mixer 40 preferably comprises a first signal processing means 42 adapted to attenuate command signals as aircraft speed decreases, a second command mixing means 44 adapted to attenuate command signals as aircraft speed increases, and a third signal processing means 46 adapted to permit passage of command signals irrespective of aircraft speed. Vertical command signal 36 is routed through second signal processing means 44 to produce a steering command signal 48 which is fed to a collective command display 50. Vertical command signal 36 is also routed through first signal processing means 42 to produce a first pitch output signal 52. Horizontal commands are fed through third signal processing means 46 to produce a second pitch output signal 54. Signals 52 and 54 are then fed to a summing junction 56 which produces a steering command signal 57 fed to a pitch cyclic command display 58.

As seen in FIG. 2, the pitch command mixer reflects vertical-plane control transitions as a function of aircraft speed. The pitch cyclic command display receives horizontal commands at all speeds, and at speeds above a maximum hover speed $V_1$, the vertical command superimposes vertical commands increasingly as speed increases up to a preselected maximum speed $V_2$ representing a minimum cruise speed. Simultaneously with the introduction of vertically oriented signals to the pitch cyclic command display, the influence of the collective command signal is reduced as speed increases from speed $V_1$ to $V_2$. This trend continues as speed increases until the collective steering display is inactive at cruise speeds above $V_2$, reflecting the way the aircraft is normally flown. The command mixing scheme shown in FIG. 2 adopts a linear complementary transition between speeds $V_1$ and $V_2$, but the shape of the transition curve can be adjusted as desired to represent the change from cruise-to-transition and hover-to-transition flight.

Figure 3:
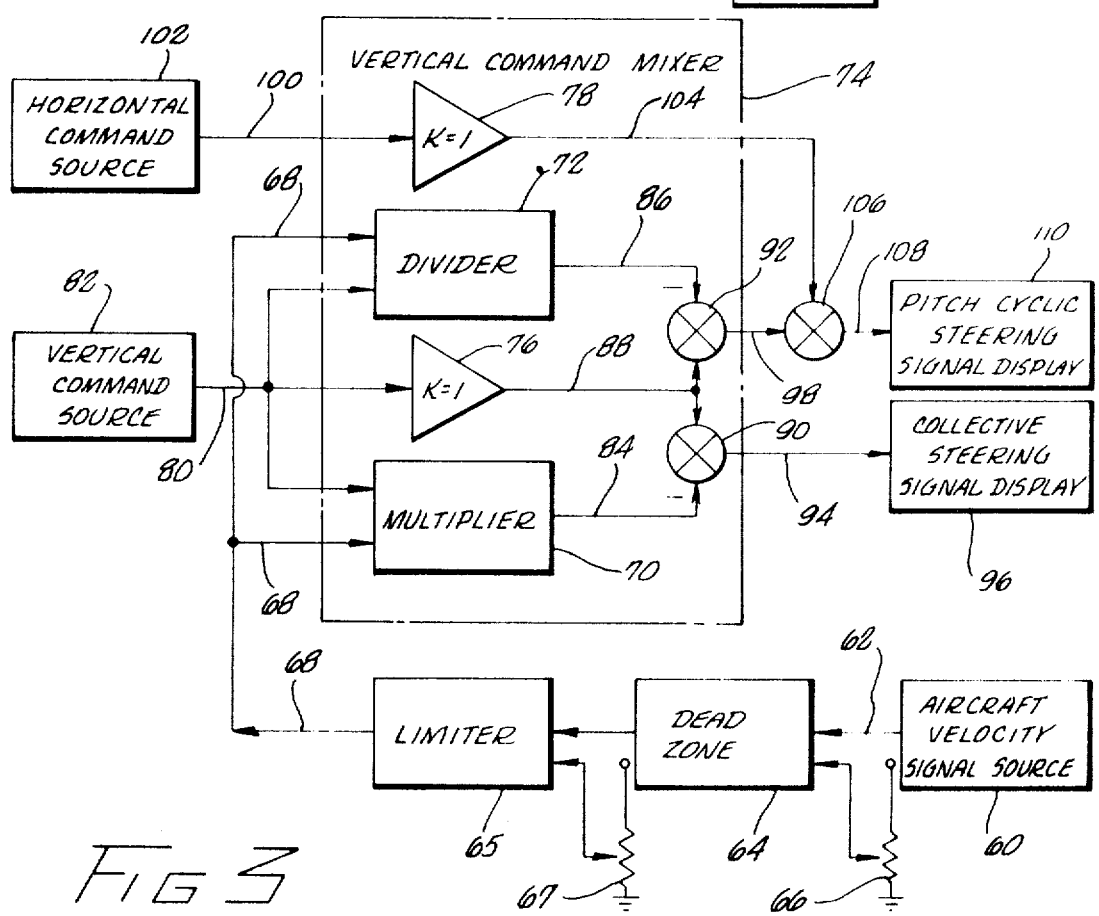
FIG. 3 is a block diagram of a preferred system of function generators used in the control system of FIG. 2.

FIG. 3 shows a preferred system of function generators for simulating the command mixing scheme of FIG. 2. An aircraft velocity signal source 60 generates a signal 62 having a magnitude representing actual aircraft ground speed, a preselected desired speed, or a desired speed analog which varies as a function of time. Velocity signal 62 is then fed through a variety of desired function generators for producing a velocity schedule for use in processing aircraft command signals. In the preferred form of this invention, signal 62 is passed through an adjustable dead zone circuit 64 and an adjustable limiter circuit 65. Dead zone 64 prevents passage of velocity signals below a preselected magnitude equaling $V_1$, and in the preferred form, the dead zone includes adjustable selector means 66 to suppress signals representing an aircraft velocity of 0–20 knots, that is, speeds below maximum hover conditions. Limiter 65 prevents passage of signals having a magnitude greater than a preselected value equaling $V_2$, and preferably includes adjustable selector means 67 to limit signals representing speeds above 60 knots, that is, speeds above the end point of cruise conditions. A properly shaped velocity signal 68 generated by the dead zone and limiter circuits is then fed to a linear-multiplying circuit 70 and a linear-dividing circuit 72 in a command mixing unit 74, which further includes a pair of unity gain amplifiers 76 and 78. A vertically referenced command signal 80 from a vertical command source 82 is routed through amplifier 76, multiplier 70, and divider 72. The multiplier simulates linear multiplication by producing an output signal 84 which reflects multiplication of vertical command signal 80 by vertical signal 68. Thus, as aircraft velocity increases from hover speed $V_1$ to cruise speed $V_2$, the relative magnitude of output signal 84 increases linearly. Similarly, divider 72 simulates linear division by producing an output signal 86 which reflects division of vertical command signal 80 by velocity signal 68. Thus, the relative magnitude of signal 86 is decreased as aircraft velocity increases. An output signal 88 generated by amplifier 76 is equal in magnitude to vertical command signal 80, and this signal is fed to first and second subtracting devices 90 and 92. Multiplier output signal 84 is fed to subtracting unit 90 which produces an output signal 94 having a magnitude representing the difference between signals 88 and 84. The result is that as aircraft speed increases, the magnitude of output signal 94 decreases, and this signal is fed to a collective steering command display or utilization means 96. Similarly, divider output signal 86 is fed to subtractor 96 for comparison with amplifier output signal 88. An output signal 98 generated by subtracting device 92 increases in magnitude as aircraft speed increases. A horizontally referenced command signal 100 from a horizontal command source 102 is routed through unity gain amplifier 78 in the command mixer to produce an output signal 104 which reflects the magnitude of the horizontal command irrespective of aircraft speed. Signals 98 and 104 are fed to a summing junction 106 where they are algebraically summed to produce an output signal 108 fed to a pitch cyclic steering display or utilization means 110. The result is that at low speeds all vertical command authority is routed to the collective display, and for high-speed conditions, the vertical command goes to the pitch cyclic display. A sharing of authority occurs at intermediate speeds. This scheduling of vertical commands reflects the way the pilot normally flies the aircraft in response to vertical error signals. The speed transition curve of the vertical mixer is not limited to the linear multiplication and division described. Other nonlinear functions can be used to vary the shape of the curve to produce a speed transition which proves optimum or preferable for a given aircraft. Further, speeds $V_1$ and $V_2$ between which the sharing of authority occurs are not limited to the same magnitudes for low-speed function generator.

A preferred command mixing scheme for achieving lateral-plane control of a VTOL or V/STOL aircraft is shown in FIG. 4. The system shown is adapted to produce a smooth transition from cruise flight, in which aircraft speed vector direction control in the horizontal plane is achieved by banking the aircraft to produce a coordinated turning maneuver, to low-speed flight such as hover, in which lateral speed vector direction control is achieved by uncoordinated maneuvering as a function of bank attitude, with constant heading or reference. Lateral-plane guidance information to be processed is provided by a lateral path error signal source 110, a roll attitude signal source 112, a heading error signal source 114, and a turn coordination error signal source 116. Lateral error source 110 generates a lateral error signal 118 which may be representative of any type of command guidance. Typically, the controlled path parameters produced by signal source 110 comprises lateral velocity summed with lateral displacement error from a desired path, or a relative lateral landing area position. Roll attitude source 112 provides a roll attitude signal 120 proportional to the displacement of the aircraft from a preselected attitude about the roll axis of the aircraft, and this signal is fed to a summing junction 121 along with lateral error signal 118. The two signals are summed algebraically to produce an output signal 122 which is fed to a third signal processing means 124 in a lateral-plane command mixing unit 126 producing an output signal 128. A heading error signal 130 is generated by signal source 114 which represents a variety of possible heading sources to be selected by the pilot. This signal is routed through a first signal processing means 132 and a second signal processing means 134 in the lateral command mixer to produce a respective pair of output signals 136 and 138. Output signals 128 and 136 are fed to a second summing junction 140 where they are summed to produce a bank command signal 142 for a bank command display 144. A signal 146 providing coordinated flight information is generated by a signal source 116 and fed to a first signal processing means 148 in the command mixer to produce an output signal 150. Signals 138 and 150 are fed to a third summing junction 152 to produce a turn signal 154 for a turn command display 156. As a result of the command scheduling scheme shown in FIG. 4, the turn command display provides information to achieve coordinated flight at high speeds. At low speeds it displays heading error. FIG. 4 shows a linear transition with speed connecting these two extremes, but the shape of the transition curve and the magnitude of the transition speeds can be adjusted as desired. Bank command display 144 is used at all speeds to control lateral path error by varying roll attitude. The heading error signal routed through the lateral command mixer to the bank command display is used primarily for path capture maneuvers at high speeds similar to those used in conventional aircraft.

The present invention has been described in the context of its applicability to the controls of VTOL or V/STOL aircraft. It is to be understood, however, that the scope of the invention is not limited thereto, but is applicable to aircraft control systems generally wherein it is appropriate to schedule commands in accordance with aircraft speed.

What is claimed is:

1. A system for mixing lateral plane commands to control lateral plane flight of an aircraft capable of ascending and descending in a substantially vertical path, the aircraft having bank command means for steering it in the lateral plane, the control system comprising means for producing command signals representative of aircraft lateral path error, roll attitude, and heading error; means for producing a signal representative of aircraft speed; means for coupling the lateral path error signal to the bank command means independent of aircraft speed; means for coupling the roll attitude signal to the bank command means independent of aircraft speed; signal processing means responsive to the heading error signal and the aircraft speed signal for producing an output signal in which the magnitude of the heading error signal decreases as aircraft speed decreases from a selected maximum speed to a selected minimum speed; and means for coupling the output signal of the signal processing means to the bank command means.

2. A control system according to claim 1, including selector means for adjusting the magnitude of the selected minimum and maximum speeds.

3. A control system according to claim 1 wherein the aircraft speed signal varies in accordance with actual aircraft speed.

4. A control system according to claim 1 wherein the output signal from the signal processing means varies linearly as a function of aircraft speed.

5. A control system according to claim 1 wherein the aircraft also has turn command means; and wherein the control system further includes means for producing a command signal representative of aircraft turn coordination error; second signal processing means responsive to the heading error signal in which the magnitude of the heading error signal increases as aircraft speed decreases from a selected maximum speed to a selected minimum speed; third signal processing means responsive to the turn coordination error signal and the aircraft speed signal for producing an output signal in which the magnitude of the turn coordination error signal decreases as aircraft speed decreases from a selected maximum speed to a selected minimum speed; and means for coupling the output signal of the second and third signal processing means to the turn command means.

6. A control system according to claim 5 including selector means for adjusting the magnitudes of the minimum and maximum speeds for the first of said signal processing means and for the second and third signal processing means.

7. A control system according to claim 5 wherein the aircraft speed signal is produced by a preselected desired speed schedule.

8. A control system according to claim 5 wherein the aircraft speed signal varies in accordance with aircraft deviation from a desired reference speed.

9. A system for mixing lateral-plane commands to control lateral-plane flight of an aircraft capable of ascending and descending in a substantially vertical path, the aircraft having turn command means for steering it in the lateral plane, the control system comprising means for producing command signals representative of aircraft heading error and turn coordination error; means for producing a signal representative of aircraft speed; first signal processing means responsive to the heading error signal and the aircraft speed signal for producing an output signal in which the magnitude of the heading error signal increases as aircraft speed decreases from a selected maximum speed to a selected minimum speed; second signal processing means responsive to the turn coordination error signal and the aircraft speed signal for producing an output signal in which the magnitude of the turn coordination error signal decreases as aircraft speed decreases from a selected maximum speed to a selected minimum speed; and means for coupling the output signals of the first and second signal processing means to the turn command means.

10. A control system according to claim 9 including selector means for adjusting the magnitudes of the selected minimum and maximum speeds.

11. A control system according to claim 9 wherein the aircraft speed signal varies in accordance with actual aircraft speed.

12. A control system according to claim 9 wherein the output signals from the first and second signal processing means vary linearly as a function of aircraft speed.

13. A system for mixing vertical plane commands to control vertical-plane flight of an aircraft capable of ascending and descending in a substantially vertical path, the aircraft having pitch cyclic command means for steering it in the vertical plane, the control system comprising means for producing a vertically referenced aircraft command signal and a horizontally referenced aircraft command signal; means for producing a signal representative of aircraft speed; means for coupling the horizontally referenced command signal to the pitch cyclic command means independent of aircraft speed; signal processing means responsive to the vertically referenced command signal and the aircraft speed signal for producing an output signal in which the magnitude of the vertically referenced command signal decreases as aircraft speed decreases from a selected maximum speed to a selected minimum speed; and means for coupling the output signal of the signal of the processing means to the pitch cyclic command means.

14. A control system according to claim 13 including selector means for adjusting the magnitude of the selected minimum and maximum speeds.

15. A control system according to claim 13 wherein the aircraft speed signal varies in accordance with actual aircraft speed.

16. A control system according to claim 13 wherein the output signal from the signal processing means varies linearly as a function of aircraft speed.

17. A control system according to claim 13 wherein the aircraft also has collective command means for steering it in the vertical plane; and wherein the control system further includes second signal processing means responsive to the vertically referenced command signal and the aircraft speed signal for producing an output signal in which the vertically referenced command signal increases as aircraft speed decreases from a selected maximum speed to a selected minimum speed; and means for coupling the output signal of the second signal processing means to the collective command means.

18. A control system according to claim 17 including selector means for adjusting the magnitudes of the selected minimum and maximum speeds for the first of said signal processing means and for the second signal processing means.

19. A control system according to claim 17 wherein the aircraft speed signal is produced by a preselected desired speed schedule.

20. A control system according to claim 17 wherein the aircraft speed signal varies in accordance with aircraft deviation from a desired reference speed.

21. A system for mixing vertical-plane commands to control vertical-plane flight of an aircraft capable of ascending and descending in a substantially vertical path, the aircraft having collective command means for steering it in the vertical plane, the control system comprising means for producing a vertically referenced aircraft command signal; means for producing a signal representative of aircraft speed; signal processing means responsive to the vertically referenced command signal and the aircraft speed signal for producing an output signal in which the magnitude of the vertically referenced command signal increases as aircraft speed decreases from a selected maximum speed to a selected minimum speed; and means for coupling the output signal of the signal processing means to the collective command means.

22. A control system according to claim 21 including selector means for adjusting the magnitude of the selected minimum and maximum speeds.

23. A control system according to claim 21 wherein the aircraft speed signal varies in accordance with actual aircraft speed.

24. A control system according to claim 21 wherein the output signal from the signal processing means varies linearly as a function of aircraft speed.

* * * * *

PO-1050
(5/69)

UNITED STATES PATENT OFFICE
CERTIFICATE OF CORRECTION

Patent No. 3,620,488            Dated November 16, 1971

Inventor(s) Justin G. Miller, deceased, by Rita A. Miller administratrix

It is certified that error appears in the above-identified patent and that said Letters Patent are hereby corrected as shown below:

Col. 1, line 64 "roll altitude" should read --roll attitude--.

Col. 2, line 37 "function low speed speed" should read --function of speed--.

Col. 5, line 41, "low speed function generator" should read --each function generator--.

Col. 6, line 59, "error signal in which" should read --error signal and the aircraft speed signal for producing an output signal in which--.

Signed and sealed this 23rd day of May 1972.

(SEAL)
Attest:

EDWARD M. FLETCHER, JR.          ROBERT GOTTSCHALK
Attesting Officer                  Commissioner of Patents